United States Patent
Price

[11] 3,790,183
[45] Feb. 5, 1974

[54] PRESSURIZED FUEL TANK SUPPORT FOR VEHICLES

[76] Inventor: William R. Price, 3607 S.E. 130th Ave., Portland, Oreg. 97236

[22] Filed: Nov. 6, 1972

[21] Appl. No.: 304,249

[52] U.S. Cl................. 280/5 A, 214/450, 214/454, 224/42.44
[51] Int. Cl............................................. B60p 3/00
[58] Field of Search.......... 280/5 R, 5 A; 224/42.44; 214/454

[56] References Cited
UNITED STATES PATENTS
1,288,839  12/1918  Conrad et al. ............ 224/42.38 UX
1,420,143   6/1922  Prichard .......................... 224/42.38
1,994,338   3/1935  Endacott.......................... 280/5 A X
3,398,846   8/1968  Ragan et al........................ 214/454

Primary Examiner—Leo Friaglia
Attorney, Agent, or Firm—Oliver D. Olson

[57] ABSTRACT

A pressurized fuel tank for a vehicle engine is confined removably in a protective case formed of a pair of hinged half shells to one of which a tank supporting base is secured. A hinge assembly, secured to one of the half shells, is adapted for attachment to a frame member of a vehicle, such as a lift truck, for supporting the case for pivotal adjustment between a retracted position within the perimeter of the vehicle, for protection of the fuel tank during operation of the vehicle, and an extended position projecting outwardly of the perimeter of the vehicle, for enabling opening of the case and replacement of the fuel tank.

13 Claims, 10 Drawing Figures

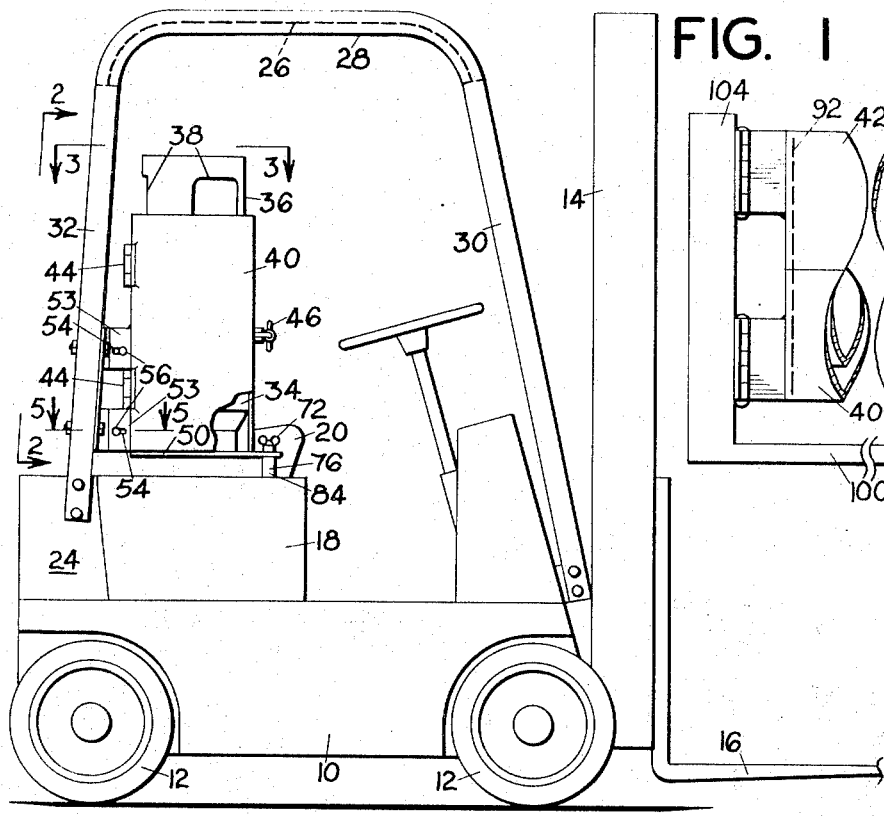

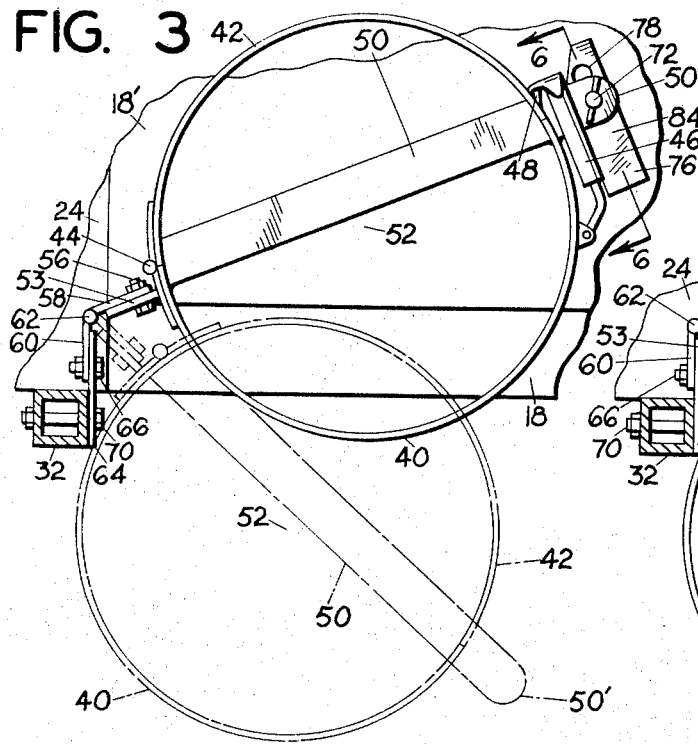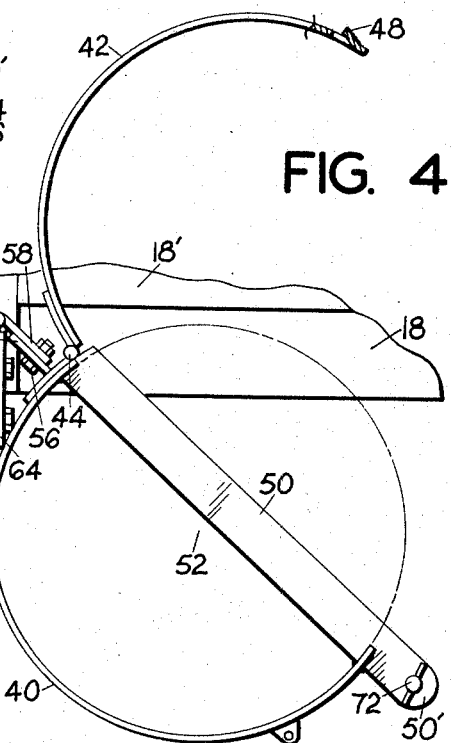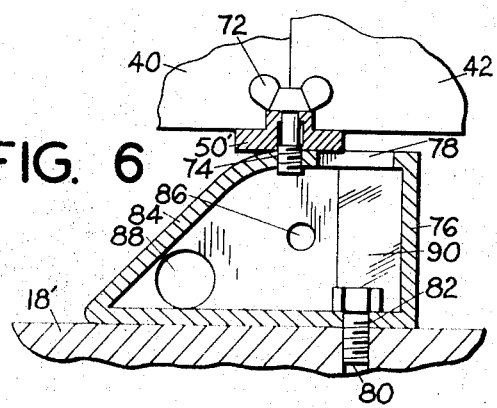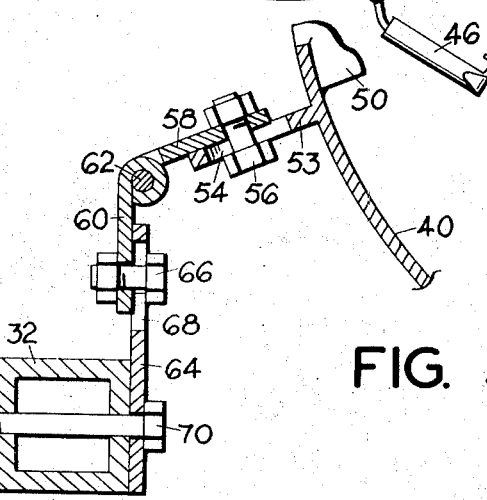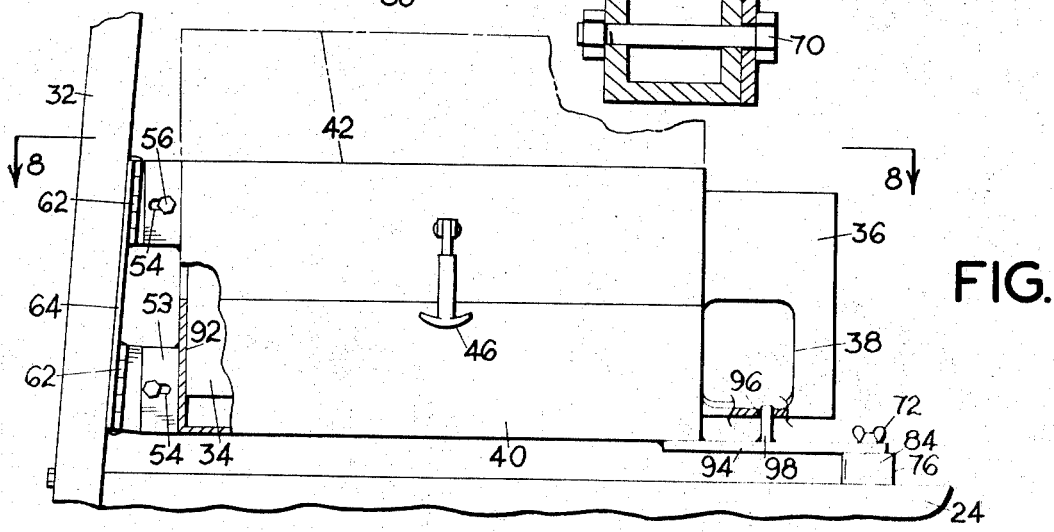

PRESSURIZED FUEL TANK SUPPORT FOR VEHICLES

BACKGROUND OF THE INVENTION

This invention relates to industrial vehicles which utilize pressurized propane or other gaseous fuel for their engines, and more particularly to a protective support for the tank which contains such pressurized fuel.

Conversion of industrial vehicle engines from liquid fuel, such as gasoline, to propane or other pressurized gaseous fuel, is gaining in popularity, particularly as a result of recent recognition of the need to reduce the magnitude of contaminants exhausted to the atmosphere. However, such conversions carry the requirement to protect the pressurized fuel tank against rupture by inadvertent contact with external objects.

Protective cases for such fuel tanks have been provided heretofore. However, they have not been completely satisfactory, primarily because they do not enable movement of the case from a protective position within the periphery of the vehicle to an exposed position outwardly of the periphery of the vehicle to facilitate replacement of the tank and/or access to the engine compartment. Additionally, such protective cases heretofore have been capable of installation only on a limited number of types of vehicles.

SUMMARY OF THE INVENTION

In its basic concept, this invention provides a protective case for pressurized fuel tanks, which case includes a mounting assembly affording a variety of adjustments for accommodating mounting on a wide variety of vehicles and movement of the case between a retracted position within the perimeter of the vehicle for protection of the fuel tank during operation of the vehicle, and an extended position projecting outwardly of the perimeter of the vehicle, to facilitate opening of the case and replacement of the fuel tank, or to allow opening of the engine hood.

It is by virtue of the foregoing basic concept that the principal objective of this invention is achieved; namely, to overcome the aforementioned disadvantages of prior protective cases.

Another important object of this invention is the provision of a protective case of the class described which accommodates the mounting of a pressurized fuel tank either in vertical position or in horizontal position.

A further important object of this invention is the provision of a protective case of the class described which is of simplified construction for economical manufacture and which is versatile in its utility with a variety of types of vehicles and the standard types of pressurized fuel tanks.

The foregoing and other objects and advantages of this invention will appear from the following detailed description, taken in connection with the accompanying drawings of preferred embodiments.

BRIEF DESCRIPTION OF THE DRAWINGS

FIG. 1 is a view in side elevation of a lift truck having mounted thereon a pressurized fuel tank support embodying the features of this invention.

FIG. 2 is a fragmentary rear end elevation, taken on the line 2-2 in FIG. 1, showing the retracted position of the support and tank in full lines and the extended positon thereof in broken lines.

FIG. 3 is a fragmentary sectional view, taken on the line 3—3 in FIG. 1, showing in plan the aforementioned retracted and extended positions of the support in full and broken lines, respectively.

FIG. 4 is a fragmentary sectional view, similar to FIG. 3, showing in plan the open arrangement of the support for replacement of a fuel tank.

FIG. 5 is a fragmentary sectional view taken on the line 5—5 in FIG. 1.

FIG. 6 is a fragmentary sectional view taken on the line 6—6 in FIG. 3.

FIG. 7 is a fragmentary view in transverse elevation showing the support of this invention in a second embodiment.

FIG. 8 is a fragmentary, foreshortened sectional view, taken on the line 8—8 in FIG. 7.

FIG. 9 is a foreshortened view in side elevation, similar to FIG. 7, showing the fuel tank support of this invention in a third embodiment.

FIG. 10 is a perspective view of an anchor block construction accommodating its use in the alternative positions illustrated in FIGS. 3 and 8.

DESCRIPTION OF THE PREFERRED EMBODIMENTS

For purposes merely of illustration, the pressurized fuel tank support of this invention is shown in FIG. 1 in association with a conventioal form of industrial lift truck. The lift truck includes a frame 10 mounted on wheels 12 and supporting at its forward end a powered elevator 14 for moving vertically a pair of laterally spaced, load-supporting forks 16. The frame also supports an internal combustion engine (not shown) confined within a housing 18 which inclues a removable cover 18' for gaining access to the engine for servicing. The left side portion of the housing supports an operator's seat 20 (FIG. 1) and backrest 22 (FIG. 2). Rearwardly of the engine housing and extending transversely of the vehicle frame is a heavy casting which functions as a counterweight 24 at the end of the vehicle opposite the lifting forks. The counterweight is secured to the frame and thus forms an integral part thereof.

Protection of the operator against falling objects is provided by an overhead roof 26 supported between a pair of laterally spaced, structural frames 28 of inverted U-shape. The downwardly extending front leg 30 of each frame is secured to the forward end of the main vehicle frame and the downwardly extending rear leg 32 of each frame is secured to the counterweight. The roof and supporting frame members thus form an integral part of the vehicle frame.

The vehicle engine is adapted, by conversion, to operate on propane or other gaseous fuel supplied in pressurized tanks. There are two forms of standard tanks, one identified as an ASME tank and the other as an ICC tank. The latter type of tank is illustrated, and it comprises a cylindrical tank 34 provided with a closed bottom end of reduced diameter and a cylindrical shield 36 extending upwardly from its upper end. The shield functions to protect the hose connections and control valves, as will be understood. Openings 38 in the cylindrical shield afford access to the hose fittings and valves.

In the use of pressurized fuel tanks for conversion of industrial vehicles, it is a regulatory requirement that the tank be protected against rupture and other damage by inadvertent contact with external objects. The support of this invention affords such protection in addition to facilitating the replacement of the tank, as is periodically required.

The support of this invention includes a protective case formed of a pair of substantially semi-circular half shells 40 and 42 of steel, aluminum or other suitable structural material. The two shells are hinged together at one of their adjacent longitudinal edges, as by means of the illustrated pair of longitudinally spaced hinges 44. The half shells thus are movable, one relative to the other, between a closed position, shown in full lines in FIG. 3, in which the half shells form a close cylindrical case for protectively surrounding a pressurized fuel tank, and an open position, shown in full lines in FIG. 4, to accommodate replacement of the fuel tank.

The closed position of the half shells is secured releasably by means of any suitable form of latch mechanism interengaging the half shells across the confronting longitudinal edges opposite the hings. In the embodiment illustrated, such a latch mechanism includes a conventional spring-retracted hook member 46 connected at one end pivotally to one of the shells. The opposite, hook end is adapted to engage an outward projection 48 on the other half shell. As illustrated in FIG. 4, the projection is formed by an outwardly struck portion of the shell.

In the embodiment illustrated in FIG. 1, the protective case is arranged to support a pressurized fuel tank 34 in vertical position. Accordingly, a base member is provided at the bottom end of the case for supporting the fuel tank thereon. As illustrated, the base member comprises an elongated bar 50 which extends across the bottom end of the case and is secured to one of the half shells only, to allow relative movement of the pair of half shells about the axis of the hinge 44.

As best illustrated in FIGS. 3 and 4, the bar 50 is secured to the half shell 40 and extends across the latter outwardly beyond the axial center 52 of the case. In this manner, the fuel tank is supported by the bar on a correspondingly outwardly displaced transverse line, i.e., on a transverse line disposed outwardly beyond the axial center of the tank. The tank thus is supported in a stable condition within the half shell 40, when the pair of half shells are opened.

It will be observed in FIGs. 3 and 4 that, although the half shells are substantially semi-circular, the half shell 40 is slightly greater than a half circle and the half shell 42 is slightly less than a half circle. This arrangement is provided in order to facilitate attachment of the narrow bar 50 to the half shell 40 in the off-center arrangement. Since the half shell 40 is slightly greater than one-half a circle, its radius is slightly larger than the radius of the half shell 42, in order to accommodate passage of the fuel tank 34 trhough the open side of the shell 40.

Means is provided for mounting the case on a vehicle frame for movement of the case between a retracted position within the perimeter of the vehicle, for protection of the fuel tank during operation of the vehicle, and an extended position projecting outwardly of the perimeter of the vehicle, for enabling opening of the case and replacement of the fuel tank, and also for allowing removal of the cover 18' to gain access to the engine. Further, the mounting means also affords adjustment of the case to proper position for supporting the fuel tank.

In this latter regard, it is to be noted from FIGS. 1 and 2 that, although the fuel tank is supported in vertical position, the rearward leg 32 of the roof support frame extends upward from the counterweight 24 angularly forward (FIG. 1) and inward (FIG. 2). Accordingly, to achieve vertical positioning of the fuel tank on the vehicle of FIG. 1, the mounting means for the case is constructed to accommodate a degree of adjustment of the latter in two perpendicular planes.

To this end, the mounting means includes a bracket, illustrated as a pair of vertically spaced plates 53 secured to and projecting outwardly from the shell 40 in the longitudinal direction of the latter. Each plate is provided with a horizontally elongated opening 54 (FIG. 5) for the reception of a clamp bolt 56. Each blamp bolt extends through an opening in one section 58 of a hinge the other section 60 of which is connected pivotally thereto by means of a hinge pin 62.

A second bracket 64 is associated with each hinge and is secured adjustably to the hinge section 60 by means of a clamp bolt 66. The clamp bolt extends through an opening in the hinge section and through a horizontally elongated opening 68 in the bracket. The bracket is adapted to be secured to the rearward leg 32 of the right hand roof frame member. Although the bracket may be secured by welding, or other permanent means, it preferably is secured removably by such means as bolts 70.

By means of the mounting thus described, the protective case is adjustable to the vertical position illustrated in FIGS. 1 and 2. The elongated openings 54 in the bracket plates 53 accommodate adjustment of the case vertically relative to the forward tilting of the roof frame leg 32, while the elongated openings 68 in the bracket 64 accommodate adjustment of the case vertically relative to the inward tilting of the leg 32 (FIG. 2).

The hinge component 62 of the mounting means affords pivotal movement of the case between the retracted and extended positions illustrated in full and broken lines, respectively, in FIG. 3. With the case swung outward to the broken line position, the latch hook 46 may be released from the projection 48 and the shell half 42 swung open (counterclockwise about the axis of the hinge 44) to the position illustrated in full lines in FIG. 4. The fuel tank thus is exposed for easy removal from the shell half 40.

Means also is provided for anchoring the case in the retracted position illustrated in full lines in FIG. 3, to prevent inadvertent outward extension of the case during operation of the vehicle. In the embodiment of FIG. 1, the tank support bar 50 is provided with an end extension 50' which supports a captive anchor screw 72 (FIG. 6) for axial rotation. The threaded shank of the screw projects downward from the extension for threaded reception in a threaded opening 74 in an anchor block 76. In the preferred construction illustrated, the anchor block is hollow. An enlarged opening 78 adjacent the threaded opening 72 allows passage therethrough of an attaching screw 80. Registering with the opening 78 is an opening 82 of smaller diameter through the opposite wall of the block for the reception of the threaded shank of the screw 80. The shank enters a threaded opening in the cover 18' of the engine housing 18. A drive socket may be extended through the enlarged opening 78 to engage the head of the screw 80, for the purpose of tightening the latter, as will be understood.

The wall 84 joining the spaced walls of the anchor block containing the openings 74, 78 and 82 is angled upwardly to provide a guiding surface for the arm extension 50' as the case is swung toward the retracted position.

The hollow anchor block also accommodates mounting in a position to allow mounting of the bottom end of the case closer to the cover 18' of the engine housing 18 than is illustrated in FIG. 6. Referring particularly to FIG. 10, the hollow anchor block is provided with a second pair of spaced walls which interconnect the spaced walls previously described. However, these second walls are spaced closer together than are the first described walls. The upper wall is provided with a threaded opening 86 for reception of the anchor screw 72, and an enlarged opening 88 which is similar in dimension and function to the enlarged opening 78 previously described. Aligned with said enlarged opening is an opening of smaller diameter through the opposite wall similar to opening 82, for reception of the securing screw 80. The upper wall also is provided with an angled section 90 which, like the angled wall previously described, serves to guide the arm extension onto the block preliminary to anchoring with the screw.

Referring now to FIGS. 7 and 8, the embodiment illustrated therein accommodates the protective support of a pressurized fuel tank 34 in horizontal position transversely of the vehicle between the rear legs 32. For this purpose the base member 92 of the case is circular in form to completely close the associated end of the case when the shell halves are in closed position. The base member is secured to the shell half 40 only, as by welding, and the adjacent end of the other half shell 42 freely overlaps it. The mounting bracket plates 53 are secured to the base member 92, preferably on a line extending perpendicular to a plane passing through the confronting edges of the shell halves, as illustrated.

Anchoring of the case in retracted position is afforded by an anchor bar 94 which is secured to the lower half shell 40, as by welding, and extends longitudinally therefrom beyond the outer end of the fuel tank. The outer end of the bar mounts the captive anchor screw 72, in the same manner as illustrated in FIG. 6. For purposes of illustration, the anchor block 76 is shown mounted on the counterweight 24 in the flat position of FIG. 10.

As is well known, the fuel tank is provided internally with a pipe which extends toward the bottom of the tank and terminates adjacent the side wall thereof. This termination point is identified externally by one or more openings 96 through the protective shield 36 at the outer end of the tank. Accordingly, means is provided for securing the tank in properly oriented position, with the terminal end of the internal pipe disposed downwardly. This is provided in the embodiment illustrated by an index pin 98 secured to the anchor arm and projecting upward therefrom for reception in the index opening in the shield.

When it is desired to replace a fuel tank, the anchor screw 72 is released from the block 76 and the case swung counterclockwise (FIG. 8) about the axis of the hinge pin 62 to an extended position rearwardly of the vehicle. The latch hook 46 is disengaged from the projection 48 and the upper shell half 42 swung open, about the common axis of the hinges 44, whereupon the fuel tank may be lifted from the lower shell half 40.

A full fuel tank then may be placed in the lower shell half with its bottom end in abutment with the base member 92 and the index pin 98 entered in the index opening 96. The upper shell half then is swung to closed position, locked with the latch hook, and the case then swung inward to the retracted position illustrated in FIG. 8 and there secured by the anchor screw 72.

In the embodiment previously described, the protective case is mounted on the rearward leg 32 of the roof frame member 28. FIG. 9 illustrates an embodiment of this invention which accommodates the mounting of the case on a vehicle independently of such roof frame. Thus, an independent supporting frame includes a horizontal sectional 100 provided with a plurality of openings 102 therethrough for the reception of screws by which to secure it to a vehicle, for example to the top wall of the engine housing 18 adjacent the cover 18', or to the counterweight 24. The frame includes a vertical post pivotal extending upwardly from the horizontal section. Since the post extends vertically, the adjustable mounting assembly previously described is not needed. Accordingly, the case is secured to the vertical post by a simple hinge 106. One section of the hinge is secured to the post 104 and the other section of the hinge is secured to the case, thereby affording pivtal movement of the case between the retracted and extended positions previously described.

In FIG. 9, the case is shown mounted for supporting a fuel tank in horizontal position, as in the embodiment illustrated in FIGS. 7 and 8. For this purpose, said other hinge section is secured to the base member 92 of the case. However, it will be understood that the embodiment of FIG. 9 may be modified to support the case and fuel tank vertically, by securing one hinge section to one of the half shells, in the manner of the embodiment of FIG. 1.

It will be understood that the base bar 50 illustrated in FIGS. 3 and 4 may be replaced by a circular end closure member 92 as illustrated in FIG. 7. In such event, both half shells may be exactly semicircular in cross section and of the same radius.

From the foregoing it will be appreciated that the present invention provides a protective support of simplified and therefore economical construction capable of mounting in diverse ways on a wide variety of types and sizes of vehicles, for supporting a pressurized fuel tank adjustment adjsutment between a retracted, protective position and an extended position which greatly facilitates the replacement of a fuel tank.

It will be apparent to those skilled in the art that various changes may be made in the size, shape, type, number and arrangement of parts described hereinbefore, without departing from the spirit of this invention.

Having now described my invention and the manner in which it may be used, I claim:

1. A protective support for a pressurized fuel tank for a vehicle, comprising
   a. a case including a pair of half shells hinged together at one of their adjacent edges for pivotal movement of the shells relative one to the other between a closed position in which the shells form a protective enclosure for a fuel tank and an open position for replacement of the fuel tank,
   b. a base member secured to one end of one of the shells for abutment by one end of a fuel tank, c. lock means releasably interengaging the pair of shells for securing them together in said closed position, and
d. pivot means secured to the case and projecting therefrom for attachment to a vehicle, for movement of the case between a retracted position within the perimeter of the vehicle for protection of a fuel tank during operation of the vehicle and an extended position projecting outwardly of the perimeter of the vehicle for enabling opening of the case and replacement of the fuel tank.

2. The protective support of claim 1 wherein the pivot means is secured to one shell of the case for supporting the latter in vertical position.

3. the protective support of claim 1 wherein the pivot means is secured to the base member for supporting the case in horizontal position.

4. The protective support of claim 1 wherein the base member comprises a bar secured across one of the shells outwardly beyond the axial center of the case for supporting a fuel tank in stable condition in said shell when the shells are open.

5. The protective support of claim 4 wherein one end of the bar extends radially outward of the shell, and anchor means is provided on said extending end for releasable engagement with a vehicle for securing the case releasably in said retracted position.

6. The protective support of claim 1 including anchor means extending from the case for releasable engagement with a vehicle, for securing the case releasably in said retracted position.

7. The protective support of claim 6 wherein the anchor means comprises a bar projecting outward of the case, and an anchor member on the bar arranged for releasable engagement with a vehicle.

8. The protective support of claim 7 including an anchor block adapted to be secured to a vehicle, and means on the block releasably engaging the anchor member.

9. The protective support of claim 7 for a fuel tank having an index opening adjacent its outer end for orienting the tank in a horizontal plane, wherein the pivot means is secured to the base member for supporting the base in vertical position, and including a projecting pin on the bar arranged for reception in the index opening of the fuel tank for orienting the latter rotationally.

10. The protective support of claim 1 wherein the pivot means includes attaching means adjustable angularly relative to the pivot axis of the pivot means for adjusting the case relative to a vehicle.

11. The protective support of claim 1 wherein the pivot means comprises
a. a pair of hinge members joined together with a hinge pin,
b. a plate member secured to the case,
c. one of the hinge and plate members having a bolt-retaining opening therethrough registering with a horizontally elongated opening in the other said members, and
d. a bolt extending through said openings for securing said members together releasably in predetermined positions of angular adjustment.

12. The protective support of claim 1 wherein the pivot means comprises
a. a pair of hinge members joined together with a hinge pin,
b. a plate member arranged to be secured to a vehicle,
c. one of the hinge and plate members having a bolt-retaining opening therethrough registering with a horizontally elongated opening in the other of said members, and
d. a bolt extending through said openings for securing said members together releasably in predetermined positions of angular adjustment.

13. The protective support of claim 1 wherein the pivot means comprises
a. a pair of hinge members joined together with a hinge pin,
b. a plate member secured to the case,
c. one of the hinge and plate members having a bolt-retaining opening therethrough registering with a horizontally elongated opening in the other of said members,
d. a bolt extending through said openings for securing said members together releasably in predetermined positions of angular adjustment,
e. a second plate member arranged to be secured to a vehicle,
f. the second plate member and the other hinge member having registering bolt-receiving and horizontally elongated openings therein, and
g. a bolt extending through said last mentioned openings for securing said members together releasably in predetermined positions of angular adjustment.

* * * * *

UNITED STATES PATENT OFFICE
CERTIFICATE OF CORRECTION

Patent No. 3,790,183            Dated    February 5, 1974

Inventor(s) WILLIAM R. PRICE

It is certified that error appears in the above-identified patent and that said Letters Patent are hereby corrected as shown below:

column 2, line 28, "conventioal" should read --conventional--.

column 4, line 16, "blamp" should read --clamp--.

column 7, line 44 "base in vertical" should read -- case in horizontal -- .

Signed and sealed this 30th day of July 1974.

(SEAL)
Attest:

McCOY M. GIBSON, JR.            C. MARSHALL DANN
Attesting Officer                Commissioner of Patents